July 17, 1928.  
E. J. SWEETLAND  
GAS DIFFUSER  
Filed Dec. 19, 1919  
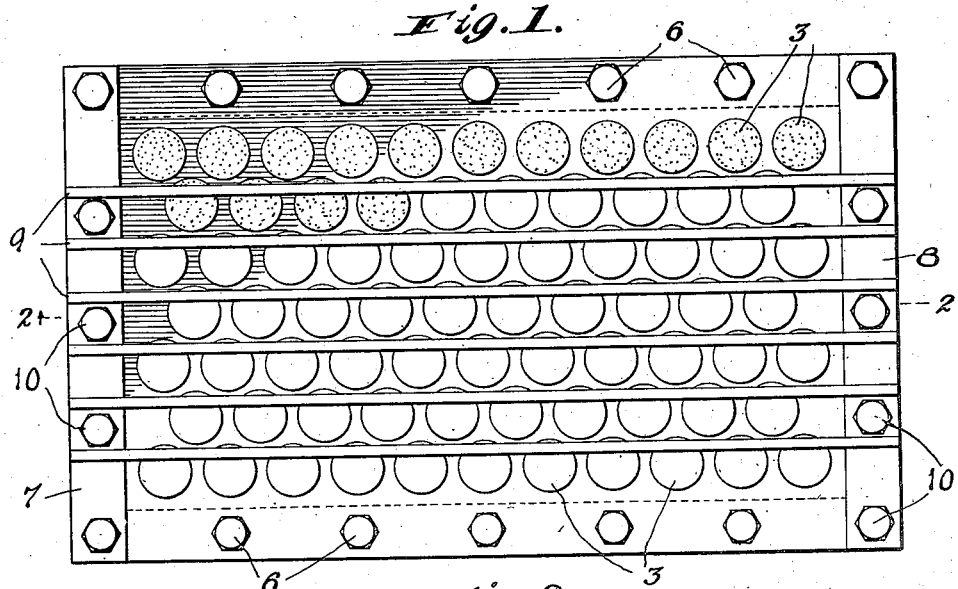
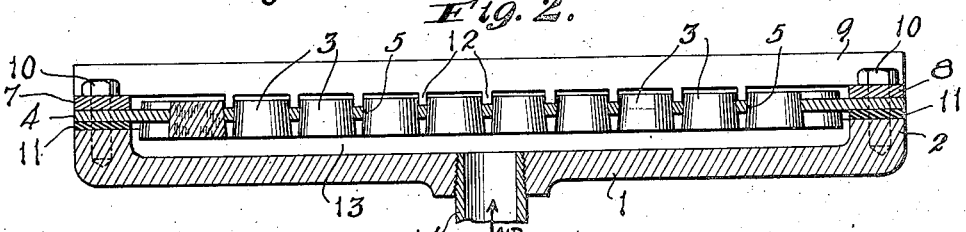
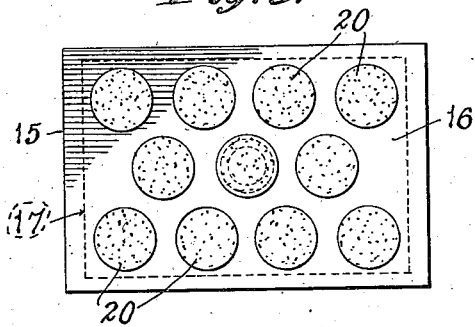
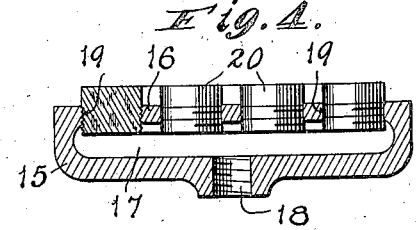
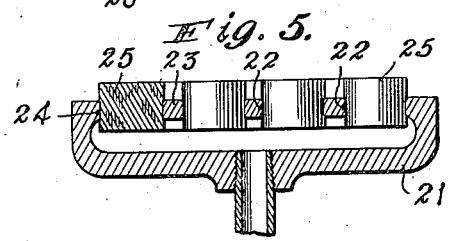
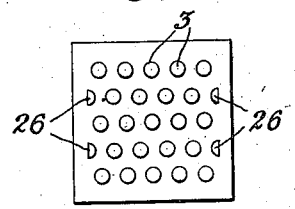
INVENTOR  
Ernest J. Sweetland  
BY  
William P. Hammond  
ATTORNEY Patented July 17, 1928.

1,677,502

UNITED STATES PATENT OFFICE.

ERNEST J. SWEETLAND, OF MONTCLAIR, NEW JERSEY.

GAS DIFFUSER.

Application filed December 19, 1919. Serial No. 346,148.

This application is for similar subject matter to my copending application, Serial No. 119,747, filed September 12th, 1916, and relates in general to apparatus designed to break up gases, such as air, into minute bubbles, which are useful in connection with many processes, such as the activation of sewage, aeration of liquids, ore separation by flotation, and in connection with gas scrubbers.

More particularly the invention relates to improved apparatus for producing minute bubbles of gas in a liquid by means of a porous substance, the pores of which produce small passages for conveying an infinite number of minute columns of a gas from the gas supply to a liquid. The objects of invention are to utilize a plurality of porous blocks in a gas diffusing apparatus for the purposes above described; to provide means for supporting said porous blocks between a gas supply and the liquid to be treated with the gas; to provide novel means for producing a close and compact arrangement of the porous blocks, whereby the available space is most advantageously utilized in the diffusion of the gas; to secure a construction comprising interchangeable porous blocks, whereby one or more of the same can be easily and quickly replaced when necessary without disturbing the other blocks; to obtain a novel construction of porous block which can be easily handled and placed in position; to provide a porous block of the character described which is substantially waterproof and which will not deteriorate, or the pores of which will not become clogged; to secure an antiseptic porous block which will act on the gas to purify the same and the liquid through which the gas is passed; and to obtain other objects and results as may be brought out by the following description:

Referring to the accompanying drawings, in which like numerals of reference indicate the same parts throughout the several views, Figure 1 is a plan view of a gas diffuser embodying one form of my invention;

Figure 2 is a vertical longitudinal sectional view through the same on the line 2—2 of Figure 1;

Figure 3 is a plan view of a modified form of the invention;

Figure 4 is a vertical sectional view of the modification shown in Fig. 3;

Figure 5 is a view similar to Figure 4 showing a further modification of the invention; and Figure 6 is a diagrammatic view of one arrangement of the blocks, such as is shown in Figures 1 to 5 inclusive, indicating the substantially uniform distribution of gas diffusing blocks over the entire available surface.

In the embodiment of the invention illustrated by Figures 1 and 2, the numeral 1 designates a base or supporting frame, said frame being provided with a peripheral upstanding flange 2. To this flange is secured a relatively thin metal plate 4, provided with a plurality of perforations 5. These perforations may be tapered or frusto-conical in form, the outside diameter being slightly smaller than the inside diameter. Into each of these perforations is forced a correspondingly frusto-conical tapered porous block or plug 3 and the unit thus formed is secured to the upstanding flange 2 by means of bolts 6 along two sides and a grid consisting of side flanges 7 and 8 and cross bars 9, the grid flanges 7 and 8 and cross bars 9, the grid being secured to the base by means of the stud bolts 10 passing through the flanges 7 and 8. Suitable gaskets 11 are provided for ensuring an airtight joint between the plate 4 and the flange 2. Each of the grid bars 9 is provided with a plurality of depending pins 12 adapted to engage the surface of the plate 4 between the blocks 3 and thereby to support the plate against distortion in a direction away from the base 1. Compressed air or other gas under pressure is admitted to the space 13 between the base 1 and the blocks through any suitable openings such as the pipe 14. It will be observed that the pressure of the air only forces the plugs more tightly into their respective holes. In order to insert as many plugs as possible in the plate 4 without unduly weakening it, the plugs are preferably arranged in staggered relation as indicated in Figure 1.

In the operation of the device, the frame 1 with the porous blocks assembled as above described is submerged in the liquid to be treated in a suitable tank or receptacle, such as shown in my before-mentioned copending application. Compressed air or other gas is admitted to the space 13, and there being no other outlet for the gas, the same will be forced through the pores of the blocks 3, producing innumerable minute bubbles in the liquid. The blocks 3 may be formed of any suitable porous material, but preferably they are composed of a vegetable medium, such as wood cut cross-wise of the grain so that when the blocks are arranged in the frame, the natural pores of the wood are arranged vertically. Many kinds of woods are suitable for the purpose, such as pine, maple and ceiba, all of which have innumerable capillary pores running with the grain, through which a compressed gas can be forced. The size of the bubbles can be varied by using different kinds of wood which have different sizes of pores, or by varying the gas pressure or by varying the distance between the air passage and the surface of the block. The bubbles slowly rise to the surface of the liquid and can be utilized for various purposes, such as for ore flotation, gas scrubbing, activation of sewage, and similar processes.

Figures 3 and 4 illustrate another method of supporting the porous blocks. In this form of the invention a metallic frame or base 15 is provided with an integral top plate 16 spaced from the bottom of the frame to provide a gas space 17 into which gas under pressure is admitted through a suitable inlet 18. The top plate 16 is formed with a plurality of screw-threaded openings 19 arranged in a staggered relation as above described, to closely mount the blocks and utilize all available space for gas diffusion. A correspondingly threaded cylindrical porous block 20 is screwed into each of the openings 19 with its pores arranged vertically as described in connection with the construction shown by Figures 1 and 2. The operation of this form of the invention is substantially identical with that above described, the compressed gas escaping through the pores of the blocks to produce bubbles in the liquid being treated.

A further modification of the invention is shown by Figure 5, in which the base or frame 21 is substantially identical with the frame 15 except that the openings 22 in the top plate 23 thereof are not screw-threaded. The openings 22 are circular in shape and have straight smooth walls 24, which are at right angles with respect to the surface of the plate 23. In the construction shown by Figure 2, the blocks have tapering sides and are held in the openings in the supporting plate by a wedging fit. The construction shown by Figure 5, however, is designed to utilize the swelling of the wood blocks for holding the blocks in the openings 22. The blocks 25 are thus formed with straight smooth sides and are driven into the openings 22 in the top plate 23. As the liquid over the blocks 25 soaks into the same, the blocks will swell so as to expand tightly against the walls of the openings 23 and securely hold the blocks in position.

In Figure 6 of the drawings, an arrangement of the blocks is diagrammatically illustrated for avoiding dead or inactive spaces in the frames. With all of the constructions above described semi-cylindrical blocks or plugs 26 may be inserted in the edges of the supporting plates so as to increase the diffusing surface thereof and utilize those portions of the plate which would otherwise be inactive.

It is also a feature of my present invention to treat the porous blocks with a preservative substance which will prevent the blocks from becoming water soaked and the pores clogged. One method of accomplishing this result is to coat the block with shellac or the like, and force air through the pores of the block until the coating is dry, whereby the shellac is prevented from clogging the pores. The blocks may also be treated with linseed oil, or creosote, or impregnated with other preservative substances in a similar manner, so that the life of the blocks is greatly prolonged, and their production of bubbles rendered more efficient.

It is desirable in many instances to combine a chemical action with the treatment of liquid by the gas, and for this purpose the porous blocks are treated or impregnated with the desired chemical whereby the gas and liquid are acted upon thereby. For instance, when an antiseptic process is desired, the blocks are saturated or otherwise treated with an antiseptic substance which will act upon the gas passing through the pores of the blocks and upon the liquid.

In addition to providing a simple and compact support and arrangement of the porous blocks, it will be observed that all of the above described constructions are portable so as to be capable of being used interchangeably in a number of tanks. Furthermore, the blocks are easily and quickly replaceable, are easy to transport and store, and embody the simplest and most reliable of constructions, all of which features are necessary in processes of the character with which the present invention is intended to be used.

Obviously, many detail modifications and changes can be made in the construction of my invention without departing from the spirit and scope of the invention and I do not desire to be limited except as required by the following claims when construed in the light of the prior art.

Furthermore, porous blocks when made of porous stone may be held in position in other suitable ways, such for instance, by the use of cement or by a ring gasket made of paper, rubber or other suitable material and I, therefore, do not wish to be limited in this respect. Also it is within the purview of my invention to use the principles above described wherever they may be found applicable or useful and I wish to specifically point out the utility of the invention in connection with the art of filtration. Consequently, where I have used the term "gas diffusing unit" in the appended claims, I do not wish to be limited thereto as I desire to also include a filter unit when the invention is applied to this latter use.

Having thus described my invention what I claim as new herein and desire to secure by Letters Patent is:

1. A gas diffusing unit comprising a porous block having the pores thereof treated with, but unobstructed by a preserving substance.

2. A gas diffusing unit comprising a porous block having the pores thereof lined with, but unobstructed by shellac.

3. A gas diffusing unit comprising a porous block having the exposed ends and interior surfaces covered with a preserving substance, adapted to leave the pores of said block unobstructed.

4. A gas diffusing unit comprising a porous block impregnated and externally and internally lined with a preserving substance, adapted to leave the pores of said block unobstructed.

5. A gas diffusing unit comprising a porous block having its pores lined with, but unobstructed by a chemical substance.

6. A gas diffusing unit including a porous wood block having the pores thereof treated with but unobstructed by a preserving substance.

ERNEST J. SWEETLAND.